United States Patent [19]
Shimoe

[11] 3,853,344
[45] Dec. 10, 1974

[54] IMPACT ABSORBING BUMPER SYSTEM

[75] Inventor: Hideo Shimoe, Tokyo, Japan

[73] Assignee: Nissan Motor Company Limited, Yokohama, Japan

[22] Filed: Nov. 16, 1972

[21] Appl. No.: 307,233

[30] Foreign Application Priority Data
Nov. 16, 1971 Japan.............................. 46-107173

[52] U.S. Cl...................... 293/84, 293/86, 267/154
[51] Int. Cl. .......................... B60r 19/04, F16f 1/16
[58] Field of Search .......... 267/57, 154; 293/84, 85, 293/86, 89

[56] References Cited
UNITED STATES PATENTS
| | | | |
|---|---|---|---|
| 2,059,908 | 11/1936 | Rabe.................................. | 267/57 |
| 3,145,685 | 8/1964 | Kulick, Sr............................ | 293/84 |
| 3,705,742 | 12/1972 | Lipscomb............................ | 293/89 |
| 3,718,364 | 2/1973 | Fisher et al......................... | 293/63 |

Primary Examiner—M. Henson Wood Jr.
Assistant Examiner—Robert Saifer

[57] ABSTRACT

An improved impact absorbing bumper system comprising two retractable struts integrated with a front or rear bumper and mounting means for mounting respective retractable struts on a chassis of the vehicle, each mounting means resisting the impact transmitted from one of the retractable struts during a collision at low-intermediate speed, and for converting a portion of the impact from the retractable strut to the torsion energy of a torsion bar embedded in the chassis during a collision at high speed, whereby the impact will be effectively reduced before transmitted to an occupant compartment of the vehicle.

1 Claim, 7 Drawing Figures

IMPACT ABSORBING BUMPER SYSTEM

The present invention relates to an impact absorbing bumper system for a wheeled vehicle, and more particularly to an impact absorbing bumper system of the type including retractable struts integrated with a bumper.

Major automotive manufacturers have made many attempts to develop such a bumper system that can sustain an impact at low-intermediate speed without damage to a body and a chassis of an automotive vehicle, in order to meet the severe requirement which will be regulated in the near future in the industrialized countries the world over. In 1973, a U.S. Government directive will require automobiles to sustain impact at 5mph (8km/h) without damage; in 1975 the safe limit will be raised to 10mph (16km/h). Hence, bearing in mind the safe limit as mentioned above, the term "low-intermediate speed" will be defined as intended to mean speeds not exceeding this safe limit, and the term "high speed" speeds exceeding this safe limit, in discussing the present invention hereinafter.

One of prior art impact absorbing bumper systems heretofore developed generally comprises two retractable struts, in the form of hydraulic dampers, integrated with a bumper and two so-called shock absorbing mounting units mounting the two hydraulic dampers on two side frames of a chassis of a vehicle. Such a shock absorbing mounting unit must resist an impact force from the hydraulic damper during a collision of the vehicle against a solid barrier at low-intermediate speed and must also absorb a portion of an impact from the hydraulic damper during a collision of the vehicle against a solid barrier at high speed. Such a prior art shock absorbing mounting unit uses shearing pins, and is so constructed as to resist impact force from a hydraulic damper during a collision of the vehicle at low-intermediate speed with the rigidity of the shearing pins and to absorb a portion of an impact from the hydraulic damper upon a collision of the vehicle at high speed by deformation of the shearing pins before they break. However, in such prior art shock absorbing mounting unit, since, it is difficult to determine a load at which each shearing pin begins to deform and a load at which each shearing pin breaks, prior art designers find great difficulties in increasing the reliability of the prior art shock absorbing mounting unit and hence, that of the prior art impact absorbing bumper system. energy absorbing capacity of a shearing pin prior art designers tend to increase the complexity and the cost of the prior art shock absorbing mounting unit, and hence those of the prior art impact absorbing bumper system.

It is therefore an object of the present invention to provide an impact absorbing bumper system that comprises no shearing pins.

It is another object of the present invention to provide an impact absorbing bumper system that has a greater reliability.

It is another object of the present invention to provide an impact absorbing bumper system that comprises mounting means utilizing a torsion bar.

These and other objects and advantages of the present invention will become apparent to those skilled in the art as the description thereof proceeds.

Briefly, an impact absorbing bumper system of the present invention is installed on a wheeled vehicle which has an end cross member and at least one side frame extending from the end cross member inwards and substantially longitudinally of the vehicle and comprises a bumper outside the end cross member; a retractable strut integrated with the bumper and extending from the bumper through the end cross member inwards along the side frame. Furthermore, mounting means is provided, which comprises a torsion bar embedded in the side frame, for mounting the retractable strut on the side frame, resisting an impact force from the retractable strut upon a collision of the vehicle with a solid barrier at low-intermediate speed, and converting a portion of an impact from the retractable strut to a torsion energy of the torsion bar upon a collision of the vehicle with a solid barrier at high speed.

The present invention will be more readily understood from the detailed description hereinafter when taken together with reference to the accompanying drawings, in which.

Figure 1:
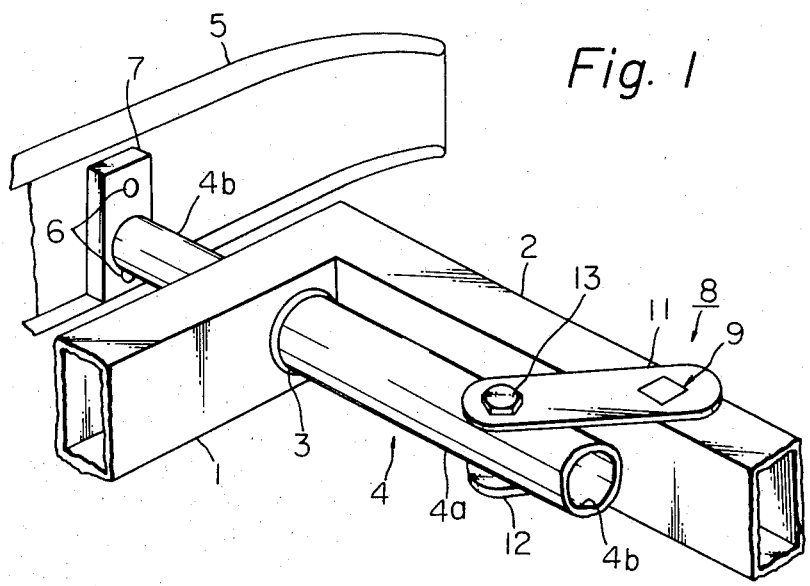
FIG. 1 is a perspective view in part of one preferred embodiment of the impact absorbing bumper system of the present invention.
Figure 2:
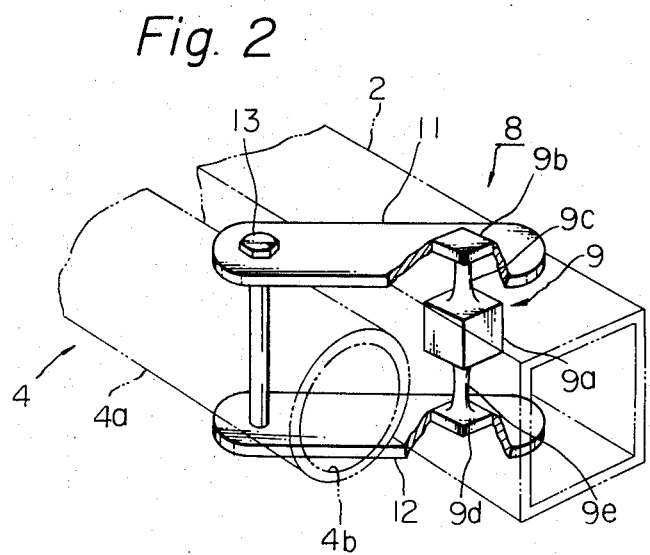
FIG. 2 is a perspective enlarged and partly fragmental view of a mounting means of the impact absorbing system of FIG. 1.
Figure 3:
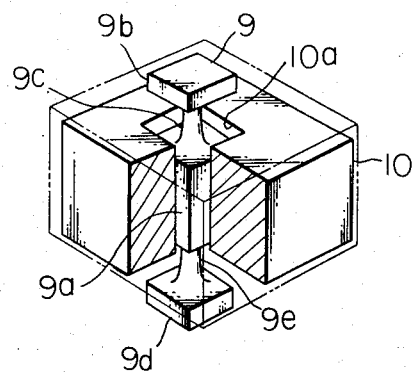
FIG. 3 is a perspective and partly fragmental view showing a torsion bar embedded in a block.

Referring now to FIGS. 1, 2 and 3, there is shown one preferred embodiment of the present invention. An end cross member 1 is connected at its end portions to two side frames (only one of which is shown) designated by a reference numeral 2. The side frames 2 extend from the end cross member 1 inwards substantially along a longitudinal direction (not shown) of a vehicle. Generally, the end cross member 1 and the side frames 2 are made of U-shaped or hollow steel members for the purpose of reducing the weight of the vehicle and increasing the strength/weight ratio of the frame. The end cross member 1 is provided with two apertures, one of which is shown and designated by a reference numeral 3, through which two retractable struts, one of which is shown and designated generally by a reference numeral 4, extends. The retractable strut 4, in the form of a hydraulic damper, comprises a cylindrical fluid reservoir 4a extending from the end cross member 1 outwards through the aperture 3 and a piston rod 4b telescopically received in the cylindrical fluid reservoir. The piston rod 4b is secured to a bumper 5, disposed outside the end cross member 10, in a conventional manner such as two bolts 6 securing a flange 7 to an inner side of the bumper 5. The cylindrical fluid reservoir 4a is mounted on the side frame 2 by mounting means generally indicated by a reference numeral 8. The mounting means 8 comprises a torsion bar 9 embedded into a block 10 built in the side frame 2 as clearly shown in FIGS. 2 and 3. The torsion bar 9 comprises a central portion 9a having a square cross section embedded into a corresponding square aperture 10a formed in the block 10 and fastened thereto by means of bolts (not shown). The torsion bar 9 also comprises an upper end 9b having a square shape cross-section integral with the central portion 9a through a rod portion 9c, and a lower end 9d which has the same cross-section as the upper end 9b and integral with the central portion 9a through a rod portion 9e. The mounting means 8 also comprises two arms 11 and 12 integrated with the torsion bar 9 at the upper and lower ends thereof, respectively. The two arms 11 and 12 extend from both ends of the torsion bar 9 to the cylindrical reservoir 4a for holding the latter therebetween and are fastened to the latter by fastening means such as a bolt 13 diametrally extending through a hollow extension 4b of the cylindrical reservoir 4. It is necessary that the torsion bar 9 is designed to have enough rigidity to resist, without any deformation thereof an impact force from the retractable strut 4 during a collision of the vehicle with a solid barrier at low-intermediate speed.

Figure 4:
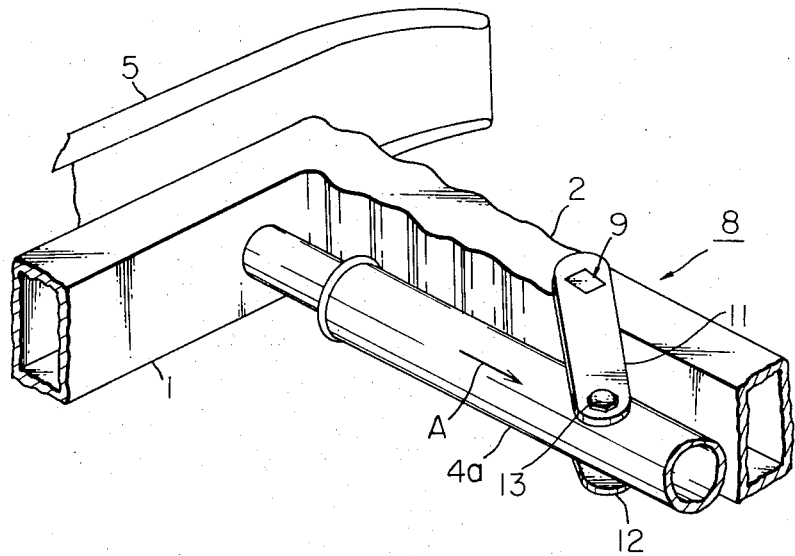
FIGS. 4 and 5 are perspective views illustrating the operations of the impact absorbing bumper system of the present invention.
Figure 5:
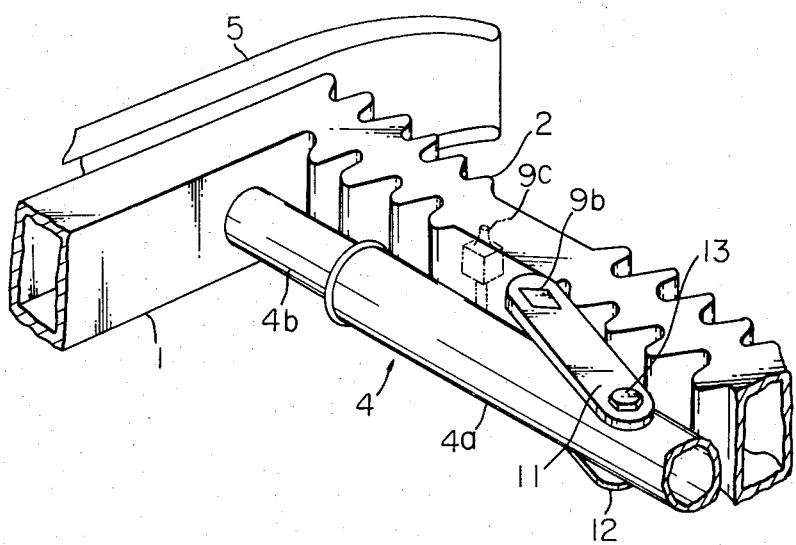
Figure 6:
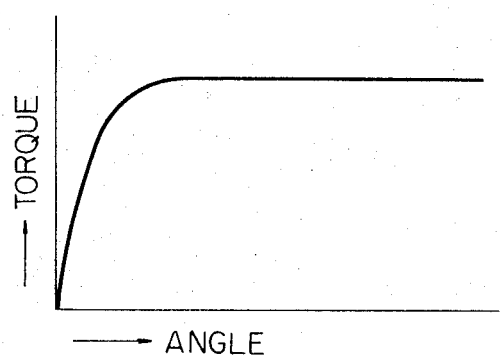
FIG. 6 is a graph showing the relationships between the torque applied in twisting the torsion bar of the mounting means and the angle through which the torsion bar is twisted.

With reference to FIGS. 4, 5 and 6 the operation of this embodiment will be described hereinafter.

The impact-absorbing bumper system constructed as heretofore described can absorb the impact of a collision of the vehicle at low-intermediate speed by the telescopic actions of the retractable struts 4 without damage to a body or a chassis such as the end cross member 1 of the vehicle. Upon a collision of the vehicle with a solid barrier at high speed each of the retractable struts 4, after absorbing a portion of the impact of the collision by the telescopic action of the piston rod 4b to its full stroke, moves inwards in a direction of an arrow A shown in FIG. 4 to transmit the remaining impact force to the arms 11 and 12. The remaining impact thus transmitted to the arms 11 and 12 twists the torsion bar 9 to apply a torque to the same, and is partly converted to a torsion energy of the torsion bar 9 before the torsion bar breaks. Referring now to FIG. 6, a graph shows the relationships between the torque applied in twisting the torsion bar 9 and the angle through which the torsion bar 9 twists. It can be appreciated that the torsion bars can absorb far more impact than the shearing pins. Further, it is readily predictable from the graph at what torque and at what twisting angle the torsion bar of the mounting means breaks, thus the impact absorbing bumper system of the present invention posseses greater reliability than the prior art. After the torsion bar 9 breaks, the impact will be absorbed by the side frames 2 as clearly shown in FIGS. 4 and 5.

Figure 7:
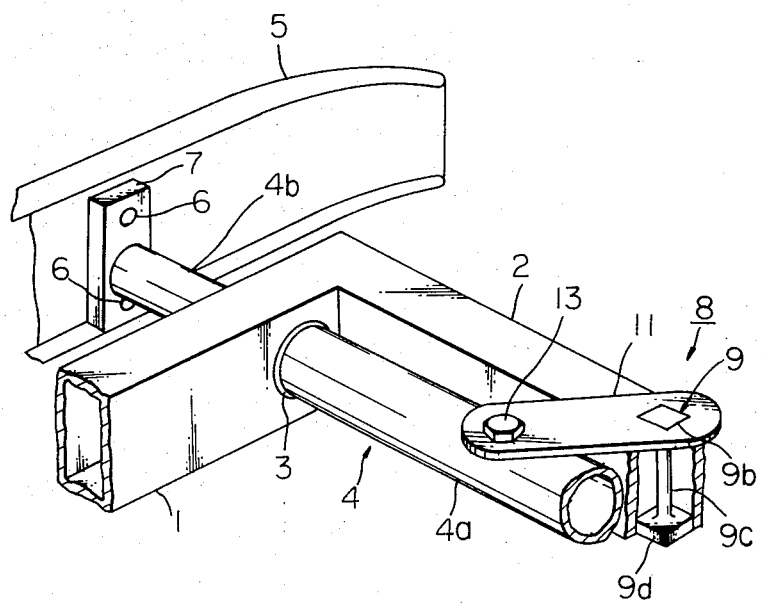
FIG. 7 is a perspective view of another embodiment of the impact absorbing bumper system of the present invention.

Referring now to FIG. 7, there is shown another embodiment of the impact absorbing bumper system of the present invention, in which like reference numerals designate corresponding parts of the first embodiment illustrated in FIGS. 1 to 5. This embodiment is similar to the first embodiment except for that a torsion bar 9 is directly embedded into a side frame 2 at a lower end 9d thereof. An upper end is integral with the lower end through a rod portion 9c. Extending from the upper end 9b to the cylindrical fluid reservoir 4a is an arm 11. The arm 11 is fastened to the cylindrical fluid reservoir 4a by means of a bolt 13.

The operation of this embodiment will be readily seen from the description of the operation of the first embodiment, thus it is omitted for the sake of simplicity of description.

What is claimed is:

1. An impact absorbing bumper system for a wheeled vehicle which has an end cross member, and at least one side frame extending from the end cross member inwards and substantially longitudinally of the vehicle comprising:

a bumper outside the end cross member; a retractable strut integrated with said bumper and extending from said bumper through the end cross member inwards and substantially longitudinally of the vehicle; and mounting means, which comprises a torsion bar embedded in the side frame, for mounting said retractable strut on said side frame, resisting an impact force transmitted from said retractable strut upon a collision of the vehicle with a solid barrier at low-intermediate speed and converting a portion of an impact transmitted from said retractable strut to a torsion energy of said torsion bar upon a collision of the vehicle with a solid barrier at high speed, said mounting means further comprising two arms integrated wih said torsion bar and extending from upper and lower ends of said torsion bar to said retractable strut for holding said retractable strut therebetween; and fastening means for fastening said two arms to said retractable strut, said mounting means further comprising a block built in said side frame, in which block said torsion bar is embedded, and said torsion bar still further comprising a central portion having a square cross-section; an upper end having a square cross section; a rod portion interconnecting said central portion and said upper end; a lower end having a square cross-section; and a second rod portion interconnecting said central portion and said lower end, and wherein said torsion bar is embedded at the central portion thereof in said block built in said side frame.

* * * * *